United States Patent
Oja et al.

(10) Patent No.: US 12,189,444 B2
(45) Date of Patent: Jan. 7, 2025

(54) RESET DOMAIN CONTROL

(71) Applicant: Nordic Semiconductor ASA, Trondheim (NO)

(72) Inventors: Ari Oja, Oulu (FI); Martin Olof Olsson, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/273,726

(22) PCT Filed: Feb. 4, 2022

(86) PCT No.: PCT/EP2022/052765
§ 371 (c)(1),
(2) Date: Jul. 21, 2023

(87) PCT Pub. No.: WO2022/167610
PCT Pub. Date: Aug. 11, 2022

(65) Prior Publication Data
US 2024/0094789 A1 Mar. 21, 2024

(30) Foreign Application Priority Data
Feb. 4, 2021 (GB) ..................... 2101560

(51) Int. Cl.
G06F 1/24 (2006.01)
(52) U.S. Cl.
CPC ..................... G06F 1/24 (2013.01)

(58) Field of Classification Search
CPC ..... G06F 1/24; G06F 1/08; G06F 1/12; G06F 13/4054
See application file for complete search history.

(56) References Cited

U.S. PATENT DOCUMENTS

| 7,003,423 | B1 * | 2/2006 | Kabani | G06F 1/12 713/502 |
| 11,366,488 | B1 * | 6/2022 | Arora | G06F 1/3237 |
| 2006/0190754 | A1 * | 8/2006 | Dargelas | G06F 13/4054 713/400 |
| 2014/0351570 | A1 * | 11/2014 | Chowdhury | G06F 9/30141 713/1 |
| 2016/0027484 | A1 * | 1/2016 | Matsuo | G11C 29/789 365/189.17 |
| 2016/0048155 | A1 * | 2/2016 | Gupta | G06F 1/24 327/142 |

(Continued)

OTHER PUBLICATIONS

IPO Search Report under Section 17(5) for Great Britain Application No. 2101560.7, dated Nov. 5, 2021, 3 pages.

(Continued)

Primary Examiner — Zahid Choudhury
(74) Attorney, Agent, or Firm — Klarquist Sparkman, LLP

(57) ABSTRACT

An integrated-circuit device comprises a resettable source register in a first reset domain. A destination circuit, outside the first reset domain, is arranged to sample an output of the resettable source register. A digital logic module causes a central reset controller to output a reset-warning signal in response to receiving a request to reset first reset domain, and to reset the first domain after a predetermined delay period from outputting the reset-warning signal.

20 Claims, 3 Drawing Sheets

(56) References Cited

U.S. PATENT DOCUMENTS

| | | | |
|---|---|---|---|
| 2016/0085279 A1* | 3/2016 | Culshaw | G06F 11/1441 |
| | | | 327/142 |
| 2018/0189156 A1* | 7/2018 | Hu | G06F 1/28 |
| 2020/0192447 A1* | 6/2020 | Paterson | H03K 19/0016 |
| 2021/0247825 A1* | 8/2021 | Kelemen | H02J 1/14 |

OTHER PUBLICATIONS

International Search Report and Written Opinion for PCT/EP2022/052765, mailed Jun. 10, 2022, 13 pages.

* cited by examiner

RESET DOMAIN CONTROL

CROSS REFERENCE TO RELATED APPLICATIONS

This is the U.S. National Stage of International Application No. PCT/EP2022/052765, filed Feb. 4, 2022, which was published in English under PCT Article 21(2), which in turn claims the benefit of Great Britain Application No. 2101560.7, filed Feb. 4, 2021.

BACKGROUND OF THE INVENTION

The present invention relates to reset domain control.

Resetting a sequential logic circuit is a process for putting the circuit into a known state. This may be useful in various situations, such as at power-on of the circuit, in the event of a brownout (a significant drop in the power supply voltage), when a manual reset switch is activated, or in response to a software or hardware error condition, or critical system failure. Typically a reset signal is distributed along dedicated reset lines to all the resettable flip-flops within a reset domain so as to cause them all to be reset simultaneously.

Modern system-on-chip (SoC) devices often contain multiple reset domains, containing respective components or groups of components, such as CPUs or cryptographic engines, that can be reset without necessarily resetting the entire chip.

An SoC may also contain multiple clock domains. Typically, periodic clock signals are generated by one or more quartz crystal oscillators and distributed to clocked circuit elements, such as registers (i.e. D-type flip-flops), over one or more clock wires. A D-type flip-flop requires its input to be constant for a setup time immediately preceding each clock transition, and for a hold time immediately following each clock transition, or else its output at the next clock transition can be metastable (i.e. at a voltage somewhere between logic high and logic low). If this metastability is allowed to propagate into other circuit elements, this can lead to errors and malfunction.

Reset signals can be synchronous or asynchronous. A synchronous reset signal is synchronised to a clock signal of the domain being reset, meaning that components are not reset until the active edge of the clock signal is received, while an asynchronous reset signal causes a reset regardless of the state of the clock signal, so components are reset as soon as the reset signal is detected.

Issues with reset signals may arise in SoC devices in which a source register, operating within a first reset domain, is in communication with a destination register, operating in a second reset domain that is separate from the first reset domain. Such a communication channel is known as a Reset Domain Crossing (RDC). The second reset domain could contain processing logic, such as a CPU, or it could contain a bus. In the case of processing logic, RDC issues can lead to erroneous functionality. In the case of a bus, RDC issues can lead to bus transaction faults.

In this case, a reset of the first reset domain, but not of the second reset domain, causes the source register to reset its state while the destination register continues normal operation. The resetting of the source register may cause the input to the destination register to change. If the reset signal is not synchronised with the clock signal of the destination register, this change could occur within the set-up or hold window of the destination register, such that the destination register samples a value from the output of the source register that is somewhere in between logic high and logic low. As a result, the output of the destination register may become metastable. This could result in data being lost or in the generation of arbitrary data or other errors.

RDC issues can arise when the first and second reset domains are clocked synchronously, but the reset signal received by the first reset domain is an inherently asynchronous reset signal. They can also arise when a reset signal for the first reset domain is a synchronous reset signal, but the second reset domain is clocked asynchronously from the first reset domain. In this scenario, communication between the first and second reset domains may involve synchroniser circuits and handshake protocols, which can be disrupted by an asynchronous reset. However, this is a Clock Domain Crossing (CDC) issue rather than an RDC issue.

In an integrated-circuit device containing reset domain crossings (RDC), it is therefore important to prevent a reset of a data-source reset domain from disturbing the proper operation of a data-destination reset domain. It is known to try to mitigate such problems through functional verification of the reset behaviour, patching problems on an ad hoc basis when they arise, and careful chip design; however, this approach can be complex and slow, and may not guarantee the removal of all RDC issues.

The present invention seeks to provide an alternative approach to mitigating RDC issues in an integrated-circuit device.

SUMMARY OF THE INVENTION

When viewed from a first aspect, the invention provides an integrated-circuit device comprising:
  a resettable source register in a first reset domain;
  a destination circuit located outside the first reset domain, wherein the destination circuit is arranged to sample an output of the resettable source register; and
  a central reset controller located outside the first reset domain, wherein the central reset controller comprises:
  a reset-request input for receiving reset-request signals for requesting a reset of the first reset domain;
  a reset-warning output for outputting reset-warning signals;
  a reset-signal output for outputting reset signals to reset the first reset domain; and
  a digital logic module configured to cause the central reset controller to output a reset-warning signal from the reset-warning output in response to receiving, at the reset-request input, a reset-request signal requesting a reset of the first reset domain, and to output a reset signal, to reset the first reset domain, from the reset-signal output after a predetermined delay period from outputting the reset-warning signal.

Thus it will be appreciated that the reset controller will not issue a reset signal to reset the first reset domain until a predetermined delay after issuing a warning of the reset. By implementing a predetermined delay period of sufficient length, the device can ensure that communication from the source register (and any other registers) in the first reset domain to the destination circuit can be completed or terminated before the first reset domain is reset by the reset signal. This means that metastability in the destination circuit, arising from an unexpected reset of the first reset domain while the source register is being sampled, can be avoided.

The integrated-circuit (IC) device may be arranged so that the reset-warning signal is received by circuitry (i.e. one or more circuit components) in or associated with the first reset domain. The device may comprise a local reset controller for the first reset domain, which may be located within the first reset domain or which may be outside the first reset domain (i.e. resettable independently from the first reset domain). The local reset controller may be coupled to the reset-warning output—e.g. by one or more reset-warning lines.

The local reset controller may comprise circuitry arranged to terminate (or to instruct the termination of) a bus transaction involving the source register and a bus located outside the first reset domain in response to receiving the reset-warning signal. Thus, a reset-warning signal can be used for the safe termination of bus transactions. Activities on a bus can be ceased before an asynchronous reset affects the structure of the bus, meaning that bus transactions may be stopped gracefully, rather than with bus protocol violations and/or RDC issues at a receiving reset domain.

The IC device (e.g. the local reset controller in particular) may additionally or alternatively comprise blocking circuitry for blocking the resettable source register from being sampled from outside the first reset domain. The blocking circuitry may be arranged within an RDC path between the first reset domain and the second reset domain. The blocking circuitry may comprise a logic gate, such as an AND or an OR gate, arranged to pass an output of the source register when the blocking circuitry is in a non-blocking state and to output a steady signal (e.g. logic high) when the blocking circuitry is in a blocking state. The blocking circuitry may be arranged to switch from the non-blocking state to the blocking state in response to the reset-warning signal.

The device may comprise a plurality of reset domains— e.g. two, five, ten, twenty or more reset domains. The device may comprise a respective local reset controller for each of the plurality of reset domains. Each of local reset controllers may have some or all of the features disclosed herein in respect of the local reset controller for the first reset domain. The device may comprise a system of reset lines for carrying reset signals from the central reset controller to circuitry in each of the reset domains—e.g. to respective local reset controllers for each of the reset domains, or directly to registers in the respective reset domains.

The central reset controller may be arranged to receive reset-request signals for requesting resets of each of the plurality of reset domains. It may comprise a plurality of reset-request inputs. It may comprise a plurality of reset-warning outputs. It may comprise a plurality of reset-signal outputs. Each input and output may be distinct, e.g. connected to a different respective line or set of lines, or some of the inputs or outputs may be shared inputs or outputs. The central reset controller may be arranged to output a reset-warning signal to any of the plurality of reset domains, and then to output a reset signal to the reset domain after a respective predetermined delay period from outputting the reset-warning signal. The respective predetermined delay periods may be identical for all of the plurality of reset domains, or the controller may implement different predetermined delay periods for at least two of the reset domains.

Each predetermined delay period is preferably one or more clock cycles (of a clock signal received by the central reset controller). The digital logic module may comprise one or more timer or delay circuits for implementing the predetermined delay periods. Each predetermined delay period is preferably sufficiently long to enable all circuit components in the respective reset domain that can signal or communicate data to outside the reset domain (e.g. all registers that can be sampled from outside the reset domain) to settle to a steady state before the reset domain is reset by the reset signal. The delay period may equal, or be one clock cycle greater than, a longest period for such components in the reset domain to enter a steady state (i.e. to cease changing away from a logic high or logic low state) and/or to gracefully abort or complete transaction handshake protocols.

The predetermined delay periods may be hardwired, or they may be configurable—e.g. depending on data in one or more registers, which may be writable by software executing on a processor of the device, or through an external debug interface to the device.

By centralising the control of reset signals, the central reset controller may advantageously support dependencies between reset domains on the device. For instance, the controller may be configured or may be configurable (e.g. in the logic module) to output reset signals to two or more different reset domains (e.g. to the first reset domain and to a second reset domain) in response to receiving one reset-request signal (e.g. a signal requesting a reset of the first reset domain). In this way, the central reset control can implement controller-responder relationships between reset domains, whereby a second reset domain is always reset when the first reset domain is reset, but whereby the first reset domain is not necessarily reset whenever the second reset domain is reset. A dependency configuration may be permanent (e.g. hardwired within the digital logic module) or it may be configurable (e.g. by software executing on a processor of the device). The central reset controller may provide a register interface for configuring one or more dependencies between the receiving of reset-request signals and the outputting of reset signals.

By centralising the control of reset signals, the central reset controller may advantageously support configurable masking of reset signals. The central reset controller (e.g. the digital logic module) may be selectively or switchably configurable to mask (i.e. not output) a reset signal to a selected reset domain. The central reset controller may be configured or configurable so that such masking, when active, overrides a reset-request signal for the reset domain. The central reset controller may be configured or configurable so that such masking, when active, overrides a reset domain dependency that would otherwise have resulted in a reset signal being sent to the reset domain. The central reset controller may be configured such that a mask can be configured (e.g. enabled and disabled) by software executing on a processor of the device. The central reset controller may provide a register interface for configuring masks for reset domains.

By centralising the control of reset signals, the central reset controller may advantageously support configurable stalling of reset signals. The central reset controller may be configurable to stall a reset signal to a selected reset domain. The central reset controller may be configured such that stalling can be configured (e.g. enabled and disabled) by software executing on a processor of the device. The central reset controller may be configured, in response to receiving a reset request, to mask the reset request and to issue a 'stall' signal (e.g. an interrupt) to a CPU of the IC device. This CPU may be configured, in response, to trigger a reset of a selected reset domain (via the central reset controller) at a later time. The central reset controller may provide a register interface for configuring stalling for reset domains.

The first reset domain may be configured to issue reset-request signals to the central reset controller. The device may comprise one or more lines for passing a reset-request signal, requesting a reset of the first reset domain, from circuitry in the first reset domain to the central reset controller. More generally, the device may comprise one or more lines for passing reset-request signals from each of a plurality of reset domains, requesting a reset of the respective reset domain, from circuitry in the respective reset domain to the central reset controller. The reset-request signals may be generated by a processor or peripheral or other component in a reset domain—e.g. in response to a calculation fault, or a watchdog timer expiring, or other event requiring a reset of at least the respective reset domain (and potentially any responder reset domains).

In some embodiments, all circuitry in one or more, or preferably all, of the reset domains on the device is only able to trigger a reset of the respective reset domain containing the circuitry by sending a reset-request signal to the central reset controller. Thus in preferred embodiments, no local asynchronous resets can be triggered without involving the central reset controller. This can help to ensure RDC issues are avoided.

In some embodiments, each reset-request input for requesting a reset of a respective reset domain is connected only to one or more components within the respective reset domain. However, the central reset controller may comprise a software-reset-request input for receiving reset-request signals for requesting a reset of the first reset domain from software executing on a processor of the device. The processor need not necessarily be in the first reset domain. More generally, the central reset controller may comprise a plurality of software-reset-request inputs for receiving reset-request signals for requesting resets of respective reset domains of the plurality of reset domains, from software executing on one or more processors of the device. The processor or processors need not necessarily be in the same respective reset domain. The software-reset-request inputs may be configured to receive reset-request signals from the processor or processors through a bus (e.g. an AMBA Advanced Peripheral Bus (APB)) connected to the central reset controller.

The central reset controller may comprise one or more device reset-request inputs for receiving device-reset-request signals for requesting a reset of all the reset domains on the device, or at least of all of said plurality of reset domains. A device-reset-request input may be coupled to a power module for receiving a power-on device-reset-request signal and/or for receiving a brown-out device-reset-request signal. A device-reset-request input may be coupled to a chip pin or pad for receiving a physical device-reset-request signal—e.g. from a physical reset button connected to the IC device. A device-reset-request input may be configured to receive a critical-system-failure device-reset-request signal. The central reset controlled may be configured to output reset signals to all of the plurality of reset domains in response to receiving a device-reset-request signal. It may be configured to output the reset signals without first issuing reset-warning signals. It may be configured to output the reset signals immediately (i.e. within one clock cycle) of receiving a device-reset-request signal. This can ensure swift resetting, e.g. in case of a critical system failure, in cases where RDC issues are not a concern because most or all of the device is being reset.

The first reset domain may comprise a processor and/or other sequential logic circuitry.

The destination circuit may comprise a processor and/or other sequential logic circuitry. It may comprise a second processor, different from a processor in the first reset domain, or the first reset domain and the destination circuit may comprise different parts of a common processor. The destination circuit may be in a second reset domain, although this is not essential. In some embodiments, the destination circuit may be or may comprise a bus or a bus interface—e.g. an AXI or AHB bus, or an AXI-to-AXI or AHB-to-AHB bus interface. The destination circuit may comprise a destination register arranged to sample the source register.

The first reset domain and the destination circuit may be in a common clock domain or they may be in different respective clock domains which may be asynchronous. The central reset controller may be in the same clock domain as the first reset domain or it may be in a different clock domain.

The digital logic module may implement a finite state machine (FSM). It is preferably implemented in hardware not software, i.e. using dedicated logic gates distinct from those of any processor on the device.

The integrated-circuit device may be integrated on a silicon chip or other semiconductor substrate. It may be a system-on-chip (SoC). It may comprise a radio transceiver and may be a radio-on-a-chip. It may be incorporated within a larger apparatus, such as a wireless sensor device. It may be connected or connectable to one or more clock sources, such as one or more off-chip crystal oscillator. It may be connected or connectable to a power supply, such as a battery. References herein to a circuit or circuitry should be understood as encompassing circuit portions which may be open circuits—e.g. only becoming closed circuits when the device is connected to a suitable external power supply.

BRIEF DESCRIPTION OF THE DRAWINGS

Embodiments of the invention will now be described, by way of non-limiting example only, with reference to the accompanying drawings in which.

DETAILED DESCRIPTION

Figure 1:
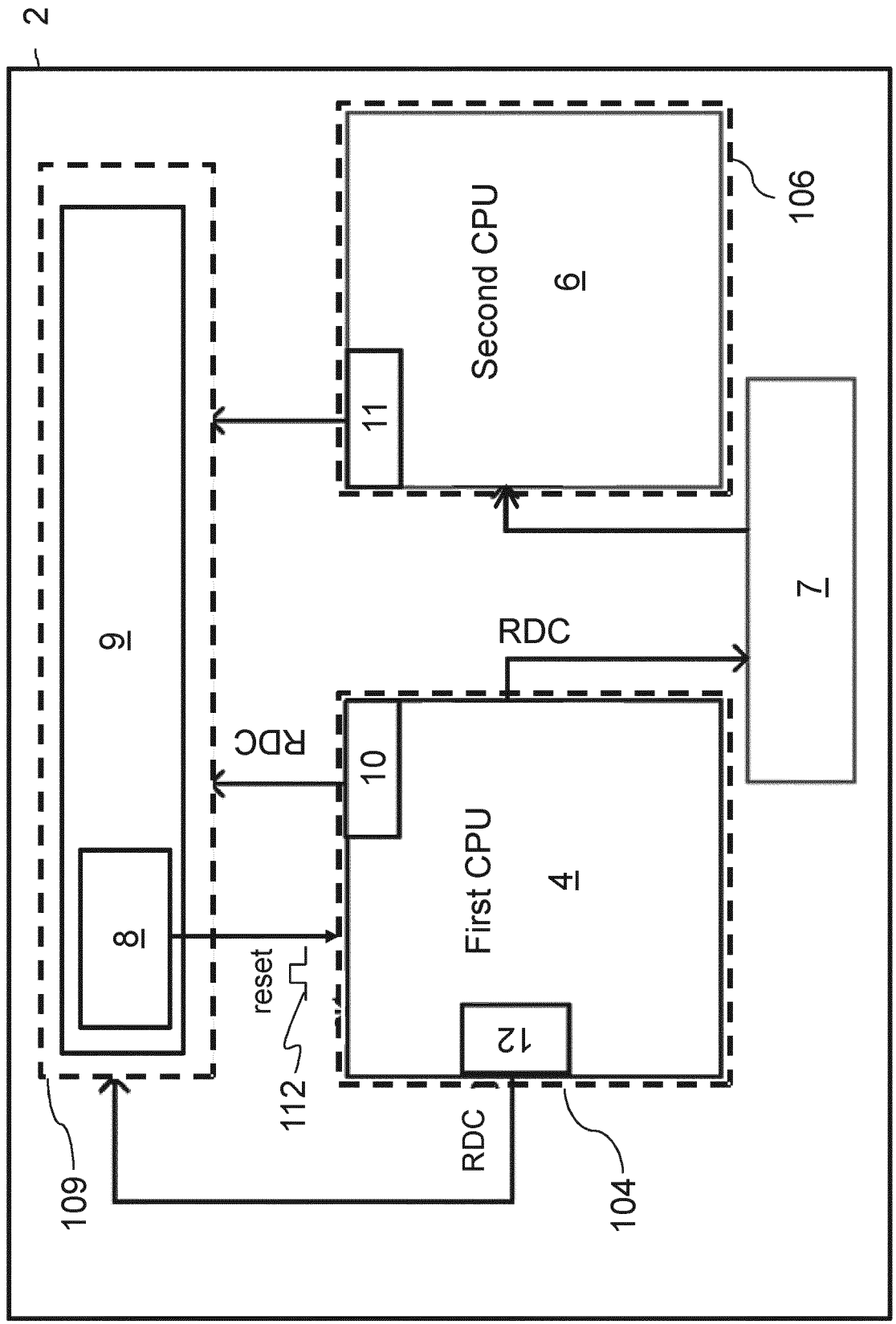
FIG. 1 is a high-level schematic of an exemplary integrated-circuit device embodying the invention.

FIG. 1 shows a schematic of an exemplary integrated-circuit device 2, which may be a single silicon chip such as a system-on-chip (SoC).

It includes a first processor (CPU) 4, a second processor (CPU) 6, and an inter-processor messaging hub 7 for supporting communication between the two processors 4, 6. The device 2 also includes volatile memory, non-volatile memory, buses, power-management circuitry, clock-control circuitry, a reset controller, and peripherals, which are omitted from FIG. 1 for simplicity.

The device 2 provides at least three separate reset domains, including:

a global reset domain 109, containing circuitry 9 that is only to be reset when the whole device 2 is reset;

a first local reset domain 104, containing the first CPU 4; and a second local reset domain 106, containing the second CPU 6.

The global reset domain 109 may contain peripherals, memory controllers, and other logic that is not normally reset unless the whole device 2 is reset. The inter-processor messaging hub 7 may be in this global reset domain 109. The global reset domain 109 also includes a novel central reset controller 8 as part of a reset control system that implements principles disclosed herein.

The CPUs 4, 6 can initiate reset-domain-crossing (RDC) transactions with components 9 in the global reset domain 109 directly over a respective Advanced eXtensible Interface (AXI) bus interconnect 10, 11. The first CPU 4 can also send RDC transactions to components 9 in the global reset domain 109 over an Advanced Microcontroller Bus Architecture (AMBA) High-performance Bus (AHB) interconnect 12. The first CPU 4 can also initiate RDC transactions with the second CPU 6 via the inter-processor communication messaging hub 7.

FIG. 1 shows how the first reset domain 104 can receive a reset signal 112 from outside the first reset domain 104. A reset of the first reset domain 104 may be triggered by another part of the device 2 or by the first CPU 4 itself. The second CPU 6 may be similarly arranged to receive reset signals.

A reset may be as a result of a watchdog timer that has not been cleared, or a software reset request, or a hardware fault or condition (e.g. a power brown-out reset or a power-on reset). If a source reset domain and a destination reset domain are within the same clock domain, an asynchronous reset of the source reset domain can cause components within the destination domain to become unstable. For example, a reset of the first reset domain 104 while a signal from the first domain 104 is being sampled by a component in the global domain 109, or the second local domain 106, can cause this signal to be sampled incorrectly. This can then cause a bus protocol violation and/or metastability in components of the receiving reset domain, which may lead to errors assuming the receiving reset domain is not reset at the same time as the first local reset domain 104. If the source and destination reset domains are within different clock domains but are arranged to communicate via a synchroniser circuit and handshake protocol, then an asynchronous reset of the source domain may lead to a disruption in the handshake protocol. However, in this case, metastability can be avoided as a result of the synchroniser circuit.

Figure 2:
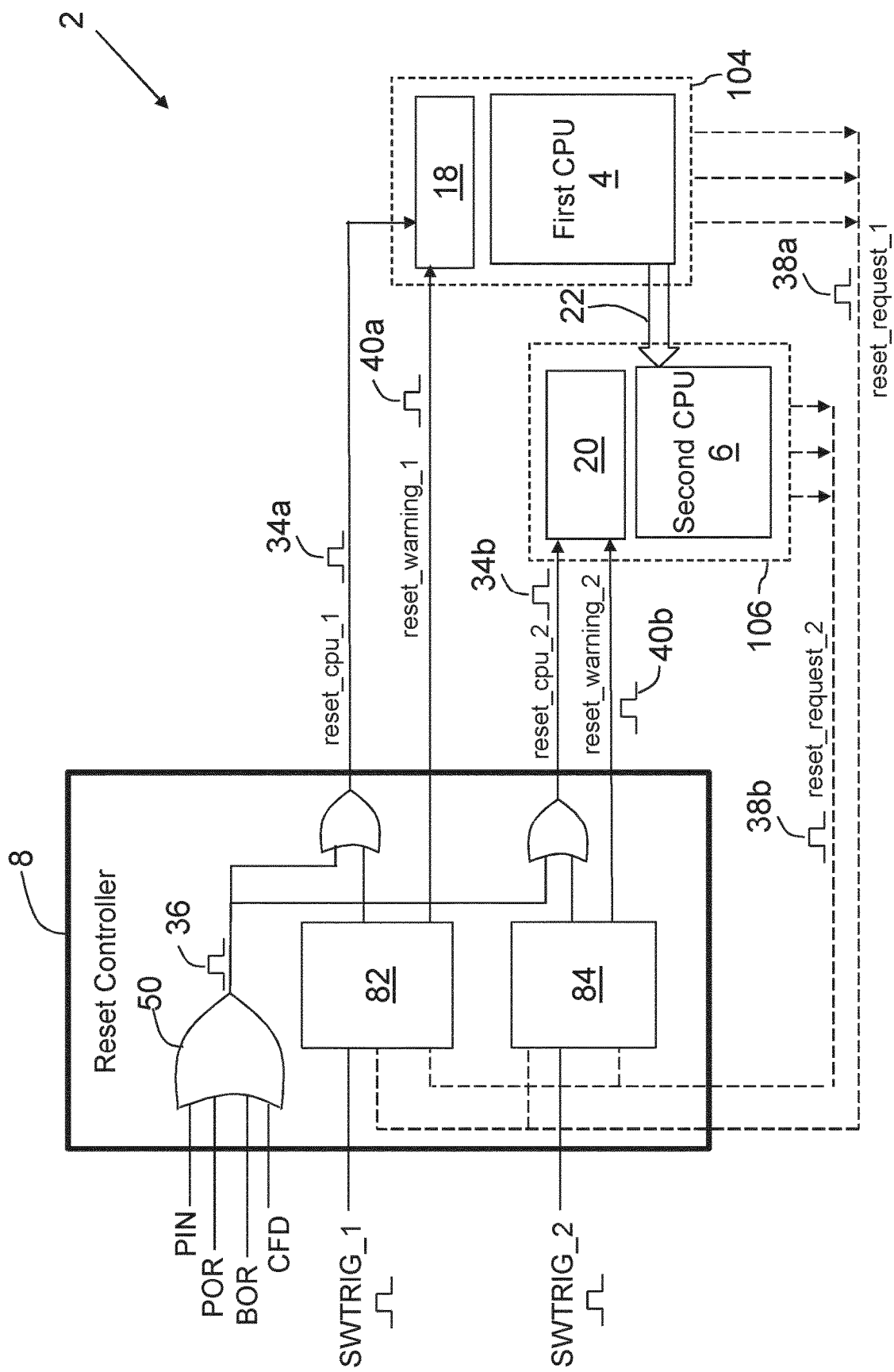
FIG. 2 is a more detailed schematic of the reset control system of the integrated-circuit device.

FIG. 2 shows more details of the reset control system of the device 2.

The reset control system includes:
a central reset controller 8;
a first local reset controller 18, coupled to the first CPU 4; and
a second local reset controller 20, coupled to the second CPU 6.

These reset controllers 8, 18, 20 are formed of dedicated hardware logic gates. They may themselves be independently resettable, e.g. using a power-on-reset. The reset controllers 8, 18, 20 may comprise synchronisation circuitry e.g. including reset deassertion synchronisation circuitry creating local asynchronous on, synchronous off resets.

The first CPU 4 is configured to communicate with the second CPU 6, via the inter-processor communication messaging hub 7, which creates an RDC path 22. This will be described in more detail below with reference to FIG. 3.

The central reset controller 8 is arranged to receive external reset signals 36 from a physical reset button ("PIN"), a power-on reset module ("POR"), and a brownout reset module ("BOR"), and a critical fault detection module ("CFD"). The central reset controller 8 is configured to forward all such external reset signals 36 issued from any of these external reset sources immediately, through an OR gate 50, to the first and second local reset controllers 18, 20, which will immediately reset their respective CPUs 4, 6. Such external resets will reset the whole chip 2 and so don't create RDC or bus issues in the same way that a partial reset can.

However, the central reset controller 8 is additionally arranged to receive a reset request to reset only the first or second CPUs 4, 6—i.e. not necessarily the whole chip 2—and to issue a corresponding reset signal to reset just the respective reset domain 104, 106. Unlike for the external resets, the controller 8 issues the reset signal only after a delay period. Instead of immediately triggering the requested reset, the central reset controller 8 first issues a warning signal to the reset domain or domains that are to be reset, in order to give these domains time to end any outgoing reset-domain-crossing transactions, before the actual local reset is triggered. Although this example shows only two reset domains 104, 106, the device 2 may contain many reset domains, which may have complex interdependencies, such that two or more domains may be reset simultaneously under certain conditions. The central reset controller 8 can manage these interdependencies and issue relevant warning and reset signals.

In this example, the first and second CPUs 4, 6 are arranged to output reset requests 38*a*, 38*b* to be sampled by the central reset controller 8, indicating that a reset of the CPU 4, 6 is required. Considering the first CPU 4, by way of example, because the first CPU 4 is configured to exchange data with the second CPU 6 via RDC path 22, the central reset controller 8 is configured so that, upon sampling a reset request signal ("reset_request_1") 38*a* from the first CPU 4 to reset the first CPU 4, the central reset controller 8 outputs a reset warning signal ("reset_warning_1") 40*a* that is sampled by the local reset controller 18 for the first CPU 4. The reset warning signal 40*a* causes logic to block the RDC path 22 from the first CPU 4 to the second CPU 6, as will be described in more detail below with reference to FIG. 3. After a predetermined delay (i.e. a predetermined number of clock cycles), the central reset controller 8 outputs a reset signal ("reset_cpu_1") 34*a* to the first CPU 4, causing the first CPU 4 to reset.

The predetermined delay, or number of clock cycles, is determined at the design stage, and is set according to the greatest amount of time required for any receiving component of the second reset domain 106, or of any other reset domain that can receive signals from the first reset domain 104, to stabilise.

Therefore, by the time the first CPU 4 is reset, all transactions from the first CPU 4 to the second CPU 6 (and any other reset domains or buses on the device 2) will have been ceased and the states of the components of the second reset domain 106 will remain stable when the reset occurs. This can substantially reduce or eliminate the risk of RDC issues, such as metastability in the second reset domain, or bus faults, caused by asynchronous resets.

The second CPU 6 can similarly signal its intention to reset by sending a "reset_request_2" signal 38*b*, causing the central reset controller 8 to issue a "reset_warning_2" signal 40*b*, followed by a "reset_cpu_2" signal 34*b* after a second predetermined delay (which could potentially be different from the predetermined delay used for the first CPU 4).

The sending and receiving of the reset request and warning signals within the local reset domains 104, 106 is handled by the local reset controllers 18, 20.

Although in this example, a reset of the first reset domain 104 is requested from within the reset domain 104 itself, this need not necessarily always be the case. For instance, software executing on the second CPU 6 may, under certain situations, be able to request a reset of the first CPU 4. There may also be other conditions that necessitate the resetting of the first reset domain 104 from outside the domain 104—e.g. if a watchdog timer in another reset domain expires.

The central reset controller 8 further comprises inputs for receiving software reset triggers SWTRIG_1, SWTRIG_2 which can be signalled by special CPU instructions executed by the first or second CPUs 4, 6, or other CPUs on the device 2. These triggers may be bus transactions issued to the central reset controller 8, caused by an instruction stored on one of the CPUs. Upon sampling a software trigger SWTRIG_1 requesting that the first CPU 4 be reset, the central reset controller 8 is configured to output a reset warning 40a to the first CPU 4 and, after the second predetermined delay, to output a reset signal 34a to the first CPU 4. Similarly, upon sampling a software trigger SWTRIG_2 requesting that the second CPU 6 be reset, the central reset controller 8 is configured to output a reset warning 40b to the second CPU 6 and, after the predetermined delay, to output a reset signal 34b to the second CPU 6.

Although this example only shows two reset domains 104, 106, it will be appreciated that the central reset controller 8 may be connected to any number of different reset domains—e.g. five, ten, twenty or more—on the device 2. In some embodiments, the device 2 is arranged such that all internally-generated resets must be requested through the central reset controller 8, which delivers the requested reset only after a reset warning signal has been delivered.

The central reset controller 8 supports configurable relationships between different asynchronous reset domains. It contains a first configurable logic module 82 for controlling the issuing of reset warning signals 40a and reset signals 34a to the first reset domain 104, and a second configurable logic module 84 for controlling the issuing of reset warning signals 40b and reset signals 34b to the second reset domain 106. These logic modules 82, 84 comprise hardwired logic gates and may substantially share a common design. They support configurable masking, to allow a reset request to be ignored under some conditions. They also support configurable triggering dependencies, to allow one reset request to trigger a plurality of resets of different reset domains. For example, a controller-responder relationship may be established so that resetting a controller reset domain also causes one or more responder reset domains to be reset. In embodiments having further reset domains, the central reset controller 8 will comprise further similar configurable logic modules, connected to different respective reset domains, together supporting more complex masking and dependency configurations. They further support configurable delaying and stalling of a reset signal being output to one or more selected reset domains; this may be useful when a reset domain has some special requirements on the timing of its asynchronous reset.

The central reset controller 8 architecture disclosed here advantageously enables implicit hard-wired resets between domains to be straightforwardly configured at design time.

Furthermore, the configurable logic modules 82, 84 may be controlled by a register interface, which can enable them to be configured based on the data that is written into non-volatile memory at manufacture or deployment, and/or that allow them to be reconfigured by software executing on the device 2.

An additional benefit of the central reset controller 8 is that the dependent triggering and/or masking and/or timing of reset signals 34a, 34b can be configured and controlled centrally, thus allowing the timing of asynchronous resets to be finely controlled according to specific timing requirements of the reset domains.

Figure 3:
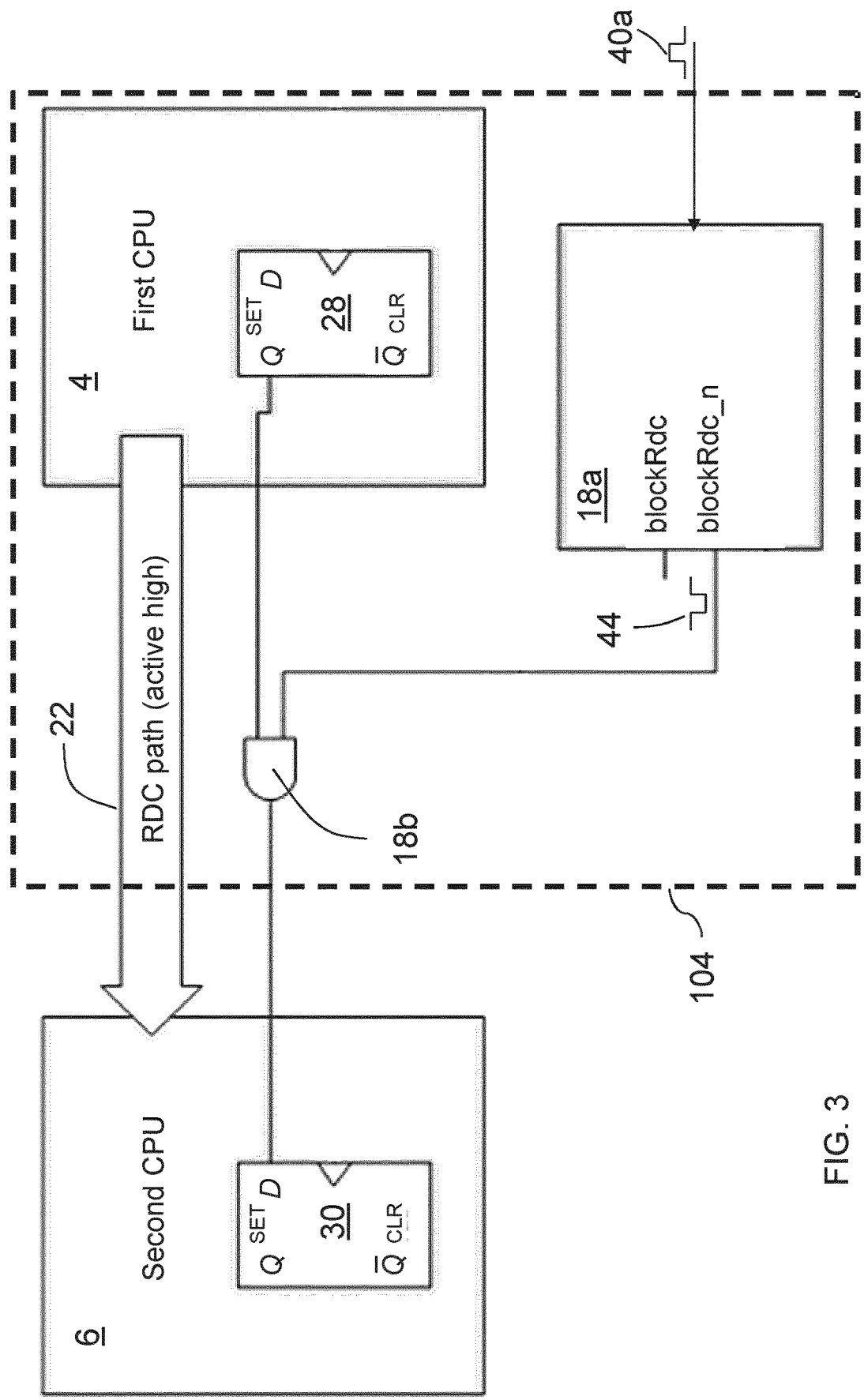
FIG. 3 is a more detailed schematic view of the first and second reset domains of the device.

FIG. 3 shows the effect of a reset warning signal 40a on the first and second CPUs 4, 6 in more detail. As discussed above, the first CPU 4 can output data for the second CPU 6 through the inter-processor communication messaging hub 7 via a path 22 that crosses a reset domain boundary.

FIG. 3 shows an exemplary source register (D-type flip-flop) 28 of the first CPU 4, and an exemplary destination register 30 in the second CPU 6. The output of the source register 28 of CPU 4 is connected to a first input of an AND gate 18b, whose output connects to the input of the destination register 30 of CPU 6. This connection forms part of the RDC path 22, also shown schematically in FIGS. 1 and 2. Of course, in practice, the connection may be more complex than this—e.g. involving more connections and involving intermediate logic in the inter-processor communication messaging hub 7 and potentially one or more buses; FIG. 3 is a simplification for the purposes of illustration the principle of operation.

The local reset controller (LRC) 18 for the first reset domain 104 comprises an LRC logic module 18a in addition to the AND gate 18b. The LRC module 18a is configured to output a blocking signal 44 to a second input of the AND gate 18b such that, when the blocking signal 44 is logic high, the output of the source register 28 is forwarded to the input of the destination register 30 and, when the blocking signal 44 is logic low, the output of the source register 28 is blocked at the AND gate 18b.

The LRC logic module 18a is arranged to receive the first reset warning 40a issued by the central reset controller 8 in response to the central reset controller 8 receiving a request for the first CPU 4 to be reset (e.g. the reset request 38a or the SWTRIG_1 signal). Upon reception of this reset warning 40a, the LRC logic 18a is configured to output a logic-low blocking signal 44 to the AND gate 18b (and potentially other similar AND gates, or OR gates, arranged to block other RDC outputs from the first reset domain 104), thus preventing the first CPU 4 from communicating with the second CPU 6 via the RDC path 22.

The destination register 30 is then able to stabilise at the logic-low level, for the length of the predetermined first delay initiated by the central reset controller 8. After the delay period has expired, the central reset controller 8 issues the reset signal 34a to the first CPU 4, as described above. The predetermined delay is set such that destination register 30 (and any other RDC destination registers that sample from the first reset domain 104) will have stabilised before the first CPU 4 is reset.

Although the RDC transaction between the first and second CPUs 4, 6 has been shown in FIG. 3 to be a directly wired transaction, it will be appreciated that RDC paths may also exist between components of the device 2 via a bus. In such a case, a warning signal can be sent from the central reset controller 8 to the bus arbiter and used to terminate bus transactions safely, so that activities on the bus are ceased before the asynchronous reset affects the structure of the bus. This is potentially applicable to all bus interfaces, direct-memory access (DMA) interfaces, and RAM interfaces in the device 2. Thus, the central reset controller 8 can be used to output reset warnings to halt ongoing bus transactions gracefully, without breaking the bus protocol, in addition to avoiding causing RDC issues at destination reset domains.

If the device 2 contains asynchronous reset domains, the reset warning signals may be synchronized locally within the local reset controller logic modules, e.g. using a two flip-flop synchronizer, before triggering the output of one or more blocking signals to AND (or OR) gates for blocking communications between reset domains. It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
a resettable source register in a first reset domain;
a destination circuit located outside the first reset domain, wherein the destination circuit is arranged to sample an output of the resettable source register; and
a central reset controller located outside the first reset domain,
wherein the central reset controller comprises:
a reset-request input for receiving reset-request signals for requesting a reset of the first reset domain;
a reset-warning output for outputting reset-warning signals;
a reset-signal output for outputting reset signals to reset the first reset domain; and
a digital logic module configured to cause the central reset controller to output a reset-warning signal from the reset-warning output in response to receiving, at the reset-request input, a reset-request signal requesting a reset of the first reset domain, and to output a reset signal, to reset the first reset domain, from the reset-signal output after a predetermined delay period from outputting the reset-warning signal.

2. The integrated-circuit device of claim 1, wherein the device comprises a local reset controller for the first reset domain, and wherein the reset-warning output of the central reset controller is coupled to the local reset controller for the first reset domain.

3. The integrated-circuit device of claim 2, wherein the local reset controller comprises circuitry arranged to terminate a bus transaction involving the source register and a bus located outside the first reset domain in response to receiving the reset-warning signal.

4. The integrated-circuit device of claim 2, wherein the local reset controller comprises blocking circuitry for blocking the source register from being sampled from outside the first reset domain in response to receiving the reset-warning signal.

5. The integrated-circuit device of claim 4, wherein the blocking circuitry comprises a logic gate arranged to pass an output of the source register when the blocking circuitry is in in a non-blocking state and to output a steady signal when the blocking circuitry is in a blocking state, wherein the blocking circuitry is arranged to switch from the non-blocking state to the blocking state in response to the local reset controller receiving the reset-warning signal.

6. The integrated-circuit device of claim 1, comprising a line for passing a reset-request signal, requesting a reset of the first reset domain, from circuitry in the first reset domain to the central reset controller.

7. The integrated-circuit device of claim 1, comprising a plurality of reset domains and a system of reset lines for carrying reset signals from the central reset controller to circuitry in each of the reset domains.

8. The integrated-circuit device of claim 7, comprising a respective local reset controller for each of the plurality of reset domains, wherein each local reset controller comprises circuitry arranged to terminate a bus transaction, involving a source register in the respective reset domain and a respective bus located outside the respective reset domain, in response to receiving the reset-warning signal, or comprises blocking circuitry for blocking a source register in the respective reset domain from being sampled from outside the respective reset domain in response to receiving the reset-warning signal.

9. The integrated-circuit device of claim 7, wherein the central reset controller is arranged to receive reset-request signals for requesting resets of each of the plurality of reset domains and wherein the digital logic module is configured to output a reset-warning signal to any of the plurality of reset domains and then to output a reset signal to the respective reset domain after a respective predetermined delay period from outputting the reset-warning signal.

10. The integrated-circuit device of claim 9, wherein the respective predetermined delay periods are different between at least two reset domains of the plurality of reset domains.

11. The integrated-circuit device of claim 7, wherein the central reset controller is configured, or can be configured, to output reset signals to two or more different reset domains in response to receiving one reset-request signal.

12. The integrated-circuit device of claim 7, wherein the central reset controller can be selectively configured to mask a reset signal to a selected reset domain, whereby the central reset controller is configured not to output a reset signal for the selected reset domain in response to a reset-request signal requesting a reset of the reset domain when the mask is active.

13. The integrated-circuit device of claim 1, wherein the or each predetermined delay period is sufficiently long to enable all circuit components in the or each respective reset domain, that can signal or communicate data to outside the reset domain, to settle to a steady state before the reset domain is reset by the reset signal.

14. The integrated-circuit device of claim 1, wherein all circuitry in any reset domain of the device is able to trigger a reset of the respective reset domain containing the circuitry only by sending a reset-request signal to the central reset controller.

15. The integrated-circuit device of claim 1, wherein each reset-request input of the central reset controller, for receiving reset-request signals requesting a reset of a respective reset domain, is connected only to one or more components within the respective reset domain.

16. The integrated-circuit device of claim 1, wherein the central reset controller comprises a software-reset-request input for receiving reset-request signals for requesting a reset of the first reset domain from software executing on a processor of the device that is located outside the first reset domain.

17. The integrated-circuit device of claim 1, wherein the central reset controller comprises one or more device reset-request inputs for receiving device-reset-request signals for requesting a reset of all of a plurality of reset domains on the device, and wherein the central reset controller is configured to output reset signals to all of the plurality of reset domains in response to receiving a device-reset-request signal at a device reset-request input without first issuing a reset-warning signal.

18. The integrated-circuit device of claim 1, wherein the first reset domain comprises a first processor and wherein the destination circuit comprises a second processor.

19. The integrated-circuit device of claim 1, wherein the first reset domain comprises a first processor and wherein the destination circuit is or comprises a bus or a bus interface.

20. The integrated-circuit device of claim 1, wherein the first reset domain and the destination circuit are in different respective asynchronous clock domains.

* * * * *